(12) United States Patent
Sugiyama

(10) Patent No.: US 7,907,959 B2
(45) Date of Patent: Mar. 15, 2011

(54) RADIO COMMUNICATION EQUIPMENT, TRANSMISSION POWER CONTROL METHOD THEREFOR, AND PROGRAM THEREFOR

(75) Inventor: Yuuichi Sugiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 807 days.

(21) Appl. No.: 11/270,609

(22) Filed: Nov. 10, 2005

(65) Prior Publication Data

US 2006/0116153 A1 Jun. 1, 2006

(30) Foreign Application Priority Data

Nov. 30, 2004 (JP) ................. 2004-345062

(51) Int. Cl.
*H04B 7/00* (2006.01)
*H04B 1/00* (2006.01)
*H04B 7/204* (2006.01)
*H04B 7/216* (2006.01)
*H04M 3/00* (2006.01)
*H04W 72/00* (2009.01)
*H04W 4/00* (2009.01)
*G08C 25/02* (2006.01)
*H04L 1/14* (2006.01)

(52) U.S. Cl. .......... 455/522; 455/69; 455/419; 455/453; 370/319; 370/331; 370/335; 714/748; 714/750

(58) Field of Classification Search ................. 455/3.03, 455/13.4, 14, 15, 434, 441, 511, 515, 522, 455/67.13, 67.16, 68, 69, 70, 114.1, 114.2, 455/114.3, 126, 146, 225, 269, 84, 125, 127.1, 455/127.2, 134, 136, 137, 138, 404.1, 404.2, 455/405, 418, 419, 420, 456.1, 456.2, 67.11, 455/436, 453, 517, 524, 572, 525, 342, 550.1; 370/318, 342, 329, 331–336, 231, 328; 342/174, 357.06, 387, 442, 457, 465; 714/704, 748, 749, 750, 751

See application file for complete search history.

(56) References Cited

U.S. PATENT DOCUMENTS

| 6,173,162 | B1 * | 1/2001 | Dahlman et al. | 455/69 |
| 6,859,445 | B1 * | 2/2005 | Moon et al. | 370/335 |
| 7,120,448 | B2 * | 10/2006 | Brouwer | 455/453 |

(Continued)

FOREIGN PATENT DOCUMENTS

CN 1868142 A 8/2004

(Continued)

OTHER PUBLICATIONS

K. Tachikawa, W-CDMA, pp. 126-129 (2001).
Japanese Office Action dated Feb. 9, 2010 with English Translation.

*Primary Examiner* — Nay Maung
*Assistant Examiner* — Paul P Tran
(74) *Attorney, Agent, or Firm* — Whitham Curtis Christofferson & Cook, PC

(57) ABSTRACT

A radio communication equipment generates transmission power control information corresponding to a comparison result between receiving quality of a signal received from a communication counterpart and target quality, and transmits the transmission power control information to the communication counterpart. The radio communication equipment includes a response monitor which monitors a response from the communication counterpart for a control message transmitted to the communication counterpart and a controller which controls the target quality to vary depending on a result of the monitoring of the response monitor.

13 Claims, 5 Drawing Sheets

U.S. PATENT DOCUMENTS

| | | | |
|---|---|---|---|
| 7,447,968 B2 * | 11/2008 | Ha et al. | 714/748 |
| 2004/0137931 A1 * | 7/2004 | Sarkar et al. | 455/522 |
| 2004/0248608 A1 * | 12/2004 | Kobayashi | 455/522 |
| 2005/0009551 A1 * | 1/2005 | Tsai et al. | 455/522 |
| 2005/0020296 A1 * | 1/2005 | Baker et al. | 455/522 |
| 2005/0032536 A1 * | 2/2005 | Wei et al. | 455/517 |
| 2005/0037796 A1 * | 2/2005 | Tsai et al. | 455/522 |

FOREIGN PATENT DOCUMENTS

| | | |
|---|---|---|
| GB | 2389280 A * | 12/2003 |
| JP | 2002-503427 | 1/2002 |
| JP | 2002-534935 | 10/2002 |
| JP | 2004-507927 | 3/2004 |
| WO | WO 2005/020464 A1 | 3/2005 |

* cited by examiner

RADIO COMMUNICATION EQUIPMENT, TRANSMISSION POWER CONTROL METHOD THEREFOR, AND PROGRAM THEREFOR

BACKGROUND OF THE INVENTION

1. Field of the Invention

The present invention relates to a radio communication equipment, a transmission power control method therefor, and a program therefor, and more particularly to radio communication equipment for generating transmission power control information corresponding to a comparison result between receiving quality of a signal received from a communication counterpart and target quality, and for transmitting the transmission power control information to the communication counterpart, and to a transmission power control method therefor and a program therefor.

2. Description of the Related Art

In a mobile communication system using a code division multiple access (CDMA) system, plural channels share the same frequency band. Each channel is distinguished by a diffusion code added thereto. Each channel becomes interference noise for other channels, and when a signal transmitted with power more than necessary exists, receiving quality of the other stations is deteriorated. Further, in general, power of a radio wave is attenuated more as a propagated distance thereof gets longer. Still further, a fluctuation of an instantaneous value of received power occurs owing to multipath phasing or the like. Accordingly, it becomes important to control the transmission power of user equipment wirelessly connected to a base station.

In order to follow a change of the number of users and the fluctuation of the instantaneous value of the received power owing to the multipath phasing, which cause the interference as described above, the CDMA system measures a signal-to-interference ratio (SIR) at the receiving side. A measurement-SIR (M-SIR) as a measurement value of the SIR and a target-SIR (T-SIR) as a target value of the SIR are compared with each other, and a transmission power control (TPC) is thus performed by a closed loop to approximate the M-SIR to the T-SIR.

However, the SIR necessary to obtain a block error rate (BLER) representing desired quality changes depending on a change of a moving speed of the user equipment under communication and a change of a propagation environment, which is caused by such a movement. In order to follow the change of the necessary SIR, the CDMA system measures the block error rate BLER, and when the measurement-BLER (M-BLER) as the measurement value of the block error rate BLER is lower than the target-BLER (T-BLER) as the target value of the block error rate BLER, the T-SIR is increased. Meanwhile, when the M-BLER is higher than the T-BLER, the T-SIR is decreased.

The adaptive control on the T-SIR as the target value of the SIR to the block error rate BLER, which is as described above, is referred to as an outer loop power control. A method for the outer loop power control is described, for example, in "W-CDMA Mobile Communication System (original title is in Japanese), Maruzen Co., Ltd., Jun. 25, 2001, pp. 126-128".

As described above, in the conventional outer loop power control, when the M-BLER is lower than the T-BLER, the T-SIR is increased, and when the M-BLER is higher than the T-BLER, the T-SIR is decreased.

However, there is a channel, in which the block error rate BLER of the control information between the base station and the user equipment cannot be measured, for instance, the channel including a dedicated control channel (DCCH), a stand-alone DCCH, and the like for speech communications. In the channel as described above, the receiving side does not use a transport format combination indicator (TFCI), so the receiving side cannot judge whether or not C-Plane data as the control information is being transmitted from the base station. Here, the C-Plane refers to a call control channel for controlling position registration, transmission, reception, and the like.

For example, it is assumed that a cyclic redundancy check (CRC) for inspecting an error of the C-Plane data is judged to be no good (NG) on the receiving side. In this case, it cannot be judged whether the CRC becomes NG because the C-Plane data is not transmitted or the CRC becomes NG because an electric field is deteriorated though the C-Plane data is transmitted. In the channel as described above, the block error rate BLER calculated based on a CRC judgment result cannot be measured.

Hence, in the case of the channel in which the block error rate BLER cannot be measured, the T-SIR cannot be increased by the conventional outer loop power control even if the quality of the control information between the base station and the user equipment is deteriorated. If it becomes impossible to exchange the control information, the communication is to be disconnected.

SUMMARY OF THE INVENTION

An aspect of the present invention is to provide a radio communication equipment, a transmission power control method therefor, and a program therefor, which solve the above-described problem, and are capable of maintaining a communication without deteriorating communication quality even in a channel in which a block error rate BLER cannot be measured.

According to the present invention, a radio communication equipment for generating transmission power control information corresponding to a comparison result between receiving quality of a signal received from a communication counterpart and target quality, and for transmitting the transmission power control information to the communication counterpart, includes:

a response monitor which monitors a response from the communication counterpart for a control message transmitted to the communication counterpart; and a controller which controls the target quality to vary depending on a result of the monitoring of the response monitor.

Further, a user equipment for generating transmission power control information corresponding to a comparison result between receiving quality of a signal received from a base station and target quality, and for transmitting the transmission power control information to the base station, includes:

a response monitor which monitors a response from the base station for a control message transmitted to the base station; and a controller which controls said target quality to vary depending on a result of the monitoring of the response monitor.

Further a base station for generating transmission power control information corresponding to a comparison result between receiving quality of a signal received from a user equipment and target quality, and for transmitting the transmission power control information to the user equipment, includes:

a response monitor which monitors a response from the user equipment for a control message transmitted to the user equipment; and a controller which controls the target quality to vary depending on a result of the monitoring of the response monitor.

Further, a transmission power control method for a radio communication equipment for generating transmission power control information corresponding to a comparison result between receiving quality of a signal received from a communication counterpart and target quality, and for transmitting the transmission power control information to the communication counterpart, includes:

a response monitoring step of monitoring a response from the communication counterpart for a control message transmitted to the communication counterpart; and a controlling step of controlling the target quality to vary depending on a result of the monitoring of the response monitoring step.

Furthermore, a program for causing a computer to execute a transmission power control method for a radio transmission equipment for generating transmission power control information corresponding to a comparison result between receiving quality of a signal received from a communication counterpart and target quality, and for transmitting the transmission power control information to the communication counterpart, the program includes:

a response monitoring step of monitoring a response from the communication counterpart for a control message transmitted to the communication counterpart; and a controlling step of controlling the target quality to vary depending on the result of the monitoring of the response monitoring step.

BRIEF DESCRIPTION OF THE DRAWINGS

These and other objects, features and advantages of the invention will become more fully apparent from the following detailed description taken in conjunction with accompanying drawings. In the drawings.

DETAILED DESCRIPTION OF THE EXEMPLARY EMBODIMENTS

Hereinafter, each exemplary embodiments of the present invention will be described in detail with reference to the drawings.

Figure 1:
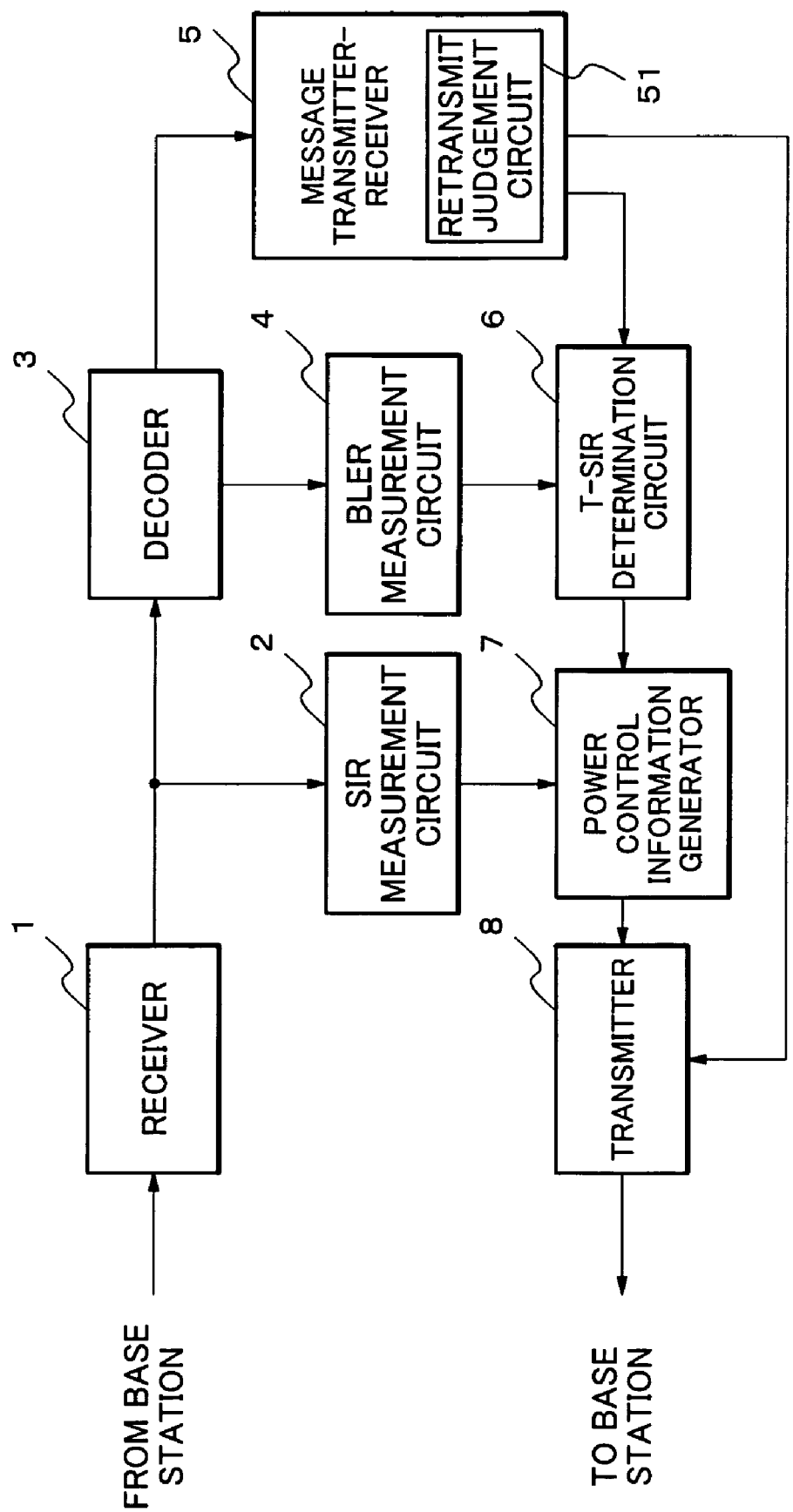
FIG. 1 is a block diagram showing a configuration of user equipment according to a first embodiment of the present invention.

FIG. 1 is a block diagram showing a configuration of user equipment according to a first embodiment of the present invention. The user equipment shown in FIG. 1 is user equipment of a mobile communication system using a CDMA system. As shown in FIG. 1, the user equipment is composed of a receiver 1, an SIR measurement circuit 2, a decoder 3, a BLER measurement circuit 4, a message transmitter-receiver 5, a T-SIR determination circuit 6, a power control information generator 7, and a transmitter 8.

The receiver 1 receives an RF signal from a base station. The SIR measurement circuit 2 measures an SIR of the RF signal received by the receiver 1. The decoder 3 decodes the received RF signal. The BLER measurement circuit 4 measures a block error rate BLER of data obtained by decoding the RF signal in the decoder 3.

The message transmitter-receiver 5 performs processing for transmitting/receiving a message. A retransmit judgment circuit 51 included in the message transmitter-receiver 5 monitors a response from the base station for a control message transmitted to the base station, and judges whether or not retransmission of the control message is to be performed based on a result of the monitoring. Upon judging by the retransmit judgment circuit 51 that the retransmission is to be performed, the message transmitter/receiver 5 performs processing for retransmitting the control message.

The T-SIR determination circuit 6 compares an M-BLER measured by the BLER measurement circuit 4 and a target value T-BLER with each other. The T-SIR determination circuit 6 variably controls the T-SIR to increase according to a result of the comparison when the M-BLER is higher than the T-BLER, and to decrease the T-SIR when the M-BLER is lower than the T-BLER.

Further, the T-SIR determination circuit 6 controls the T-SIR to vary depending on the result of the monitoring of the retransmit judgment circuit 51 of the message transmitter-receiver 5.

The power control information generator 7 compares the M-SIR measured by the SIR measurement circuit 2 and the T-SIR determined by the T-SIR determination circuit 6 with each other. When the measured M-SIR is lower than the T-SIR, the power control information generator 7 instructs the base station to increase transmission power, and otherwise, generates transmission power control information corresponding to a result of the comparison in order to instruct the base station to decrease the transmission power. The transmitter 8 transmits, to the base station, the transmission power control information generated by the power control information generator 7.

Further, upon receiving a message from the message transmitter-receiver 5, the transmitter 8 transmits the message to the base station. Note that the base station increases or decreases the transmission power of its own in accordance with the transmission power control information thus received.

Next, an operation of the user equipment according to the first embodiment of the present invention is described.

Figure 2:
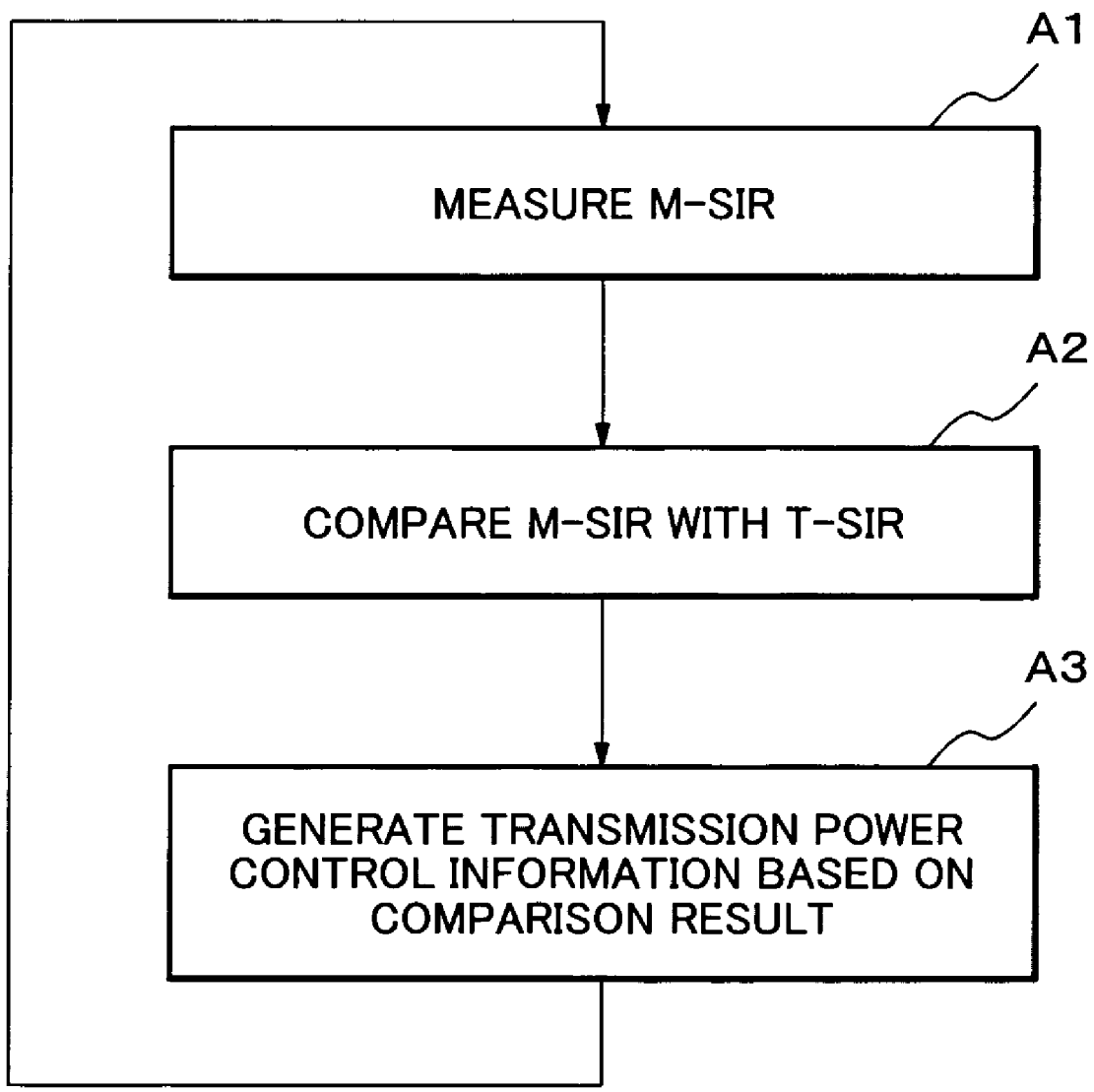
FIG. 2 is a flowchart showing operations of an SIR measurement circuit and power control information generator of FIG. 1.

FIG. 2 is a flowchart showing operations of the SIR measurement circuit 2 and the power control information generator 7. In FIG. 1 and FIG. 2, the SIR measurement circuit 2 measures the M-SIR as the measurement value of the SIR (Step A1). The power control information generator 7 compares the M-SIR with the T-SIR as the target value of the SIR, which is determined by the T-SIR determination circuit 6 (Step A2), and generates the transmission power control information (Step A3). Hence, the transmission power control information will be transmitted to the base station through the transmitter 8.

Figure 3:
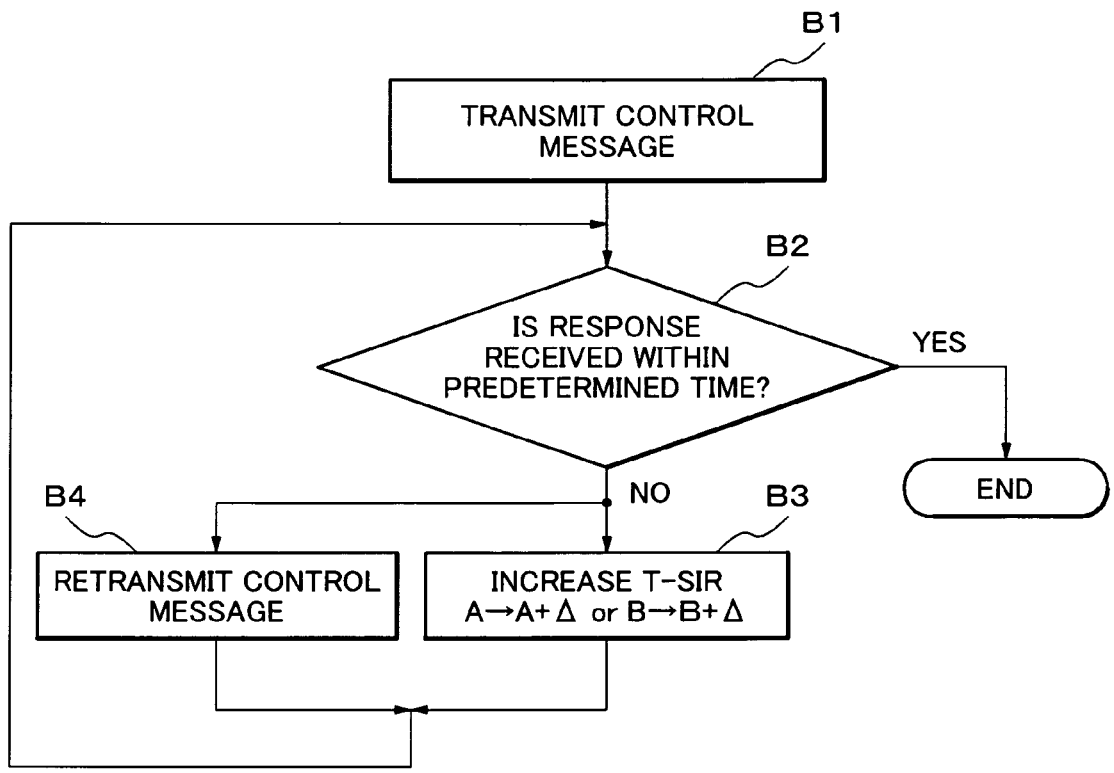
FIG. 3 is a flowchart showing operations of a message transmitter-receiver and T-SIR determination circuit of FIG. 1.

FIG. 3 is a flowchart showing operations of the message transmitter-receiver 5 and the T-SIR determination circuit 6.

The operation described in a flowchart is performed by a program controlled processor. In FIG. 1 and FIG. 3, the message transmitter-receiver 5 performs the processing for transmitting the control message to the base station (Step B1). Next, the retransmit judgment circuit 51 of the message transmitter-receiver 5 monitors the response from the base station for the control message transmitted to the base station (Step B2).

When the response cannot be received within a predetermined time from the transmission of the control message (when a result of the judgment in Step B2 is NO), the T-SIR determination circuit 6 increases a value A of the T-SIR by a predetermined value A, and outputs the value A thus increased to the power control information generator 7 (Step B3).

Further in this case, the retransmit judgment circuit 51 of the message transmitter-receiver 5 judges that the retransmission of the control message is to be performed, and accordingly, the message transmitter-receiver 5 simultaneously performs the processing for retransmitting the control message (Step B4). Hence, the control message will be retransmitted to the base station through the transmitter 8.

Thereafter, returning to Step B2, the retransmit judgment circuit 51 monitors a response from the base station for the retransmitted control message.

Figure 4:
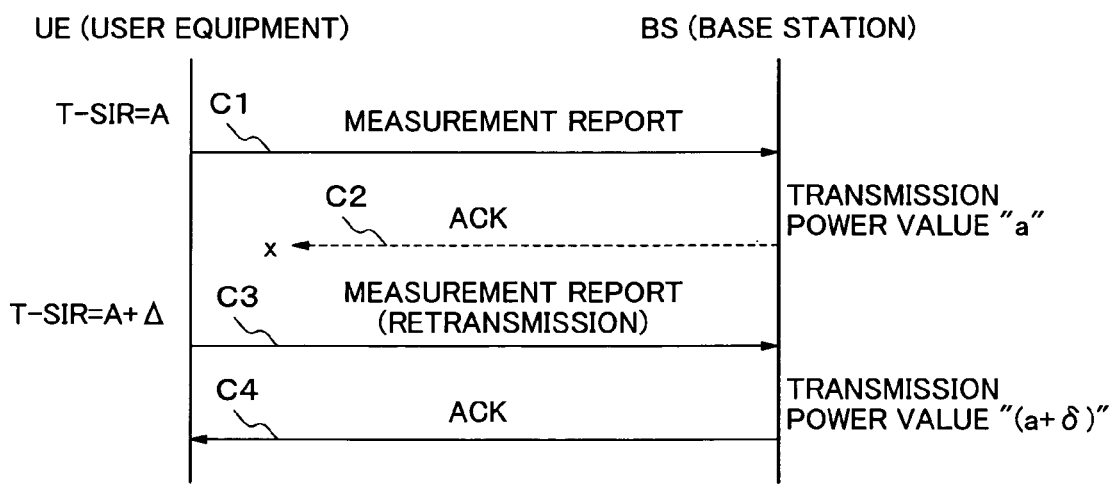
FIG. 4 is a sequence chart showing an exchange of a control message between the user equipment and base station of FIG. 1.

FIG. 4 is a sequence chart showing an exchange of the control message between the user equipment (UE) and base station (BS) of FIG. 1. In FIG. 1 and FIG. 4, the T-SIR determination circuit 6 determines a value of T-SIR-A as the target value of the SIR by comparing the M-BLER and the T-BLER with each other. Hence, the base station will control the transmission power thereof by setting a power value "a" based on the transmission power control information generated by the power control information generator 7 of the user equipment according to the comparison result between the value of the M-SIR and the value of the T-SIR=A.

In this case, a measurement report as the control message for the base station is transmitted from the user equipment (Step C1 of FIG. 4). Accordingly, the base station transmits a response "ack" for the measurement reports with the transmission power "a" (Step C2 of FIG. 4). Note that the response "ack" is a control message reporting reception of the measurement report.

Here, when the user equipment cannot receive the response "ack" for the measurement report (Step C2 of FIG. 4), the T-SIR determination circuit 6 sets the target value of the SIR at the value of T-SIR=A+Δ as shown in FIG. 3 (Step B3 of FIG. 3). Therefore, the power control information generator 7 generates the transmission power control information based on a comparison result between the value of the M-SIR and the value of the T-SIR=A+Δ (Step A3 of FIG. 2). Since the T-SIR is increased by the predetermined value Δ, the generated transmission power control information serves as information instructing the base station to increase the transmission power. Hence, the transmission power of the base station is controlled to be increased from the power value "a" by a predetermined value "δ".

Thereafter, when the measurement report is retransmitted from the user equipment (Step C3 of FIG. 4, Step B4 of FIG. 3), the base station transmits a response "ack" for the retransmitted measurement report with the transmission power at "a+δ" (Step C4 of FIG. 4).

As described above, when the user equipment retransmits the control message, that is, when there is no response from the base station for the control message, the user equipment judges that propagation characteristics have been deteriorated. Therefore, the user equipment increases the T-SIR and retransmits the control message instructing the base station to increase the transmission power. The response from the base station for the control message retransmitted from the user equipment will be transmitted to the user equipment with the increased transmission power.

Hence, it becomes easy for the user equipment to receive the response from the base station for the retransmitted control message, and in such a way, a communication disconnection owing to such a reception failure of the control information between the base station and the user equipment is avoided, thus making it possible to maintain the communication quality.

As described above, when there is no response for the control message transmitted from the user equipment to the base station, the user equipment judges that the propagation characteristics are deteriorated, and increases the T-SIR. Therefore, even in a channel in which the deterioration of the propagation characteristics cannot be judged based on the block error rate BLER, such a communication disconnection owing to the reception failure of the control information between the base station and the user equipment will be avoided, thus making it possible to maintain the communication quality.

Note that, in FIG. 3, when the response for the control message cannot be received (when the judgment result of Step B2 is NO), the user equipment increases the T-SIR immediately (Step B3). Here, the T-SIR may also be adapted to be increased for the first time when the response cannot be received continuously n (n is an integer of two or more) times.

Further, though the T-SIR is increased in Step B3 of FIG. 3, the T-SIR may also be adapted not to be increased if the value of the T-SIR is a predetermined threshold value or more. In such a way, the transmission power is prevented from being increased too much, thus making it possible to reduce the interference for other channels.

Next, a second embodiment of the present invention is described. In the first embodiment of the present invention, description has been made about the power control of a down link. Described in the second embodiment is an example where, a control, similar to the power control of the down link, is applied to an up link.

Figure 5:
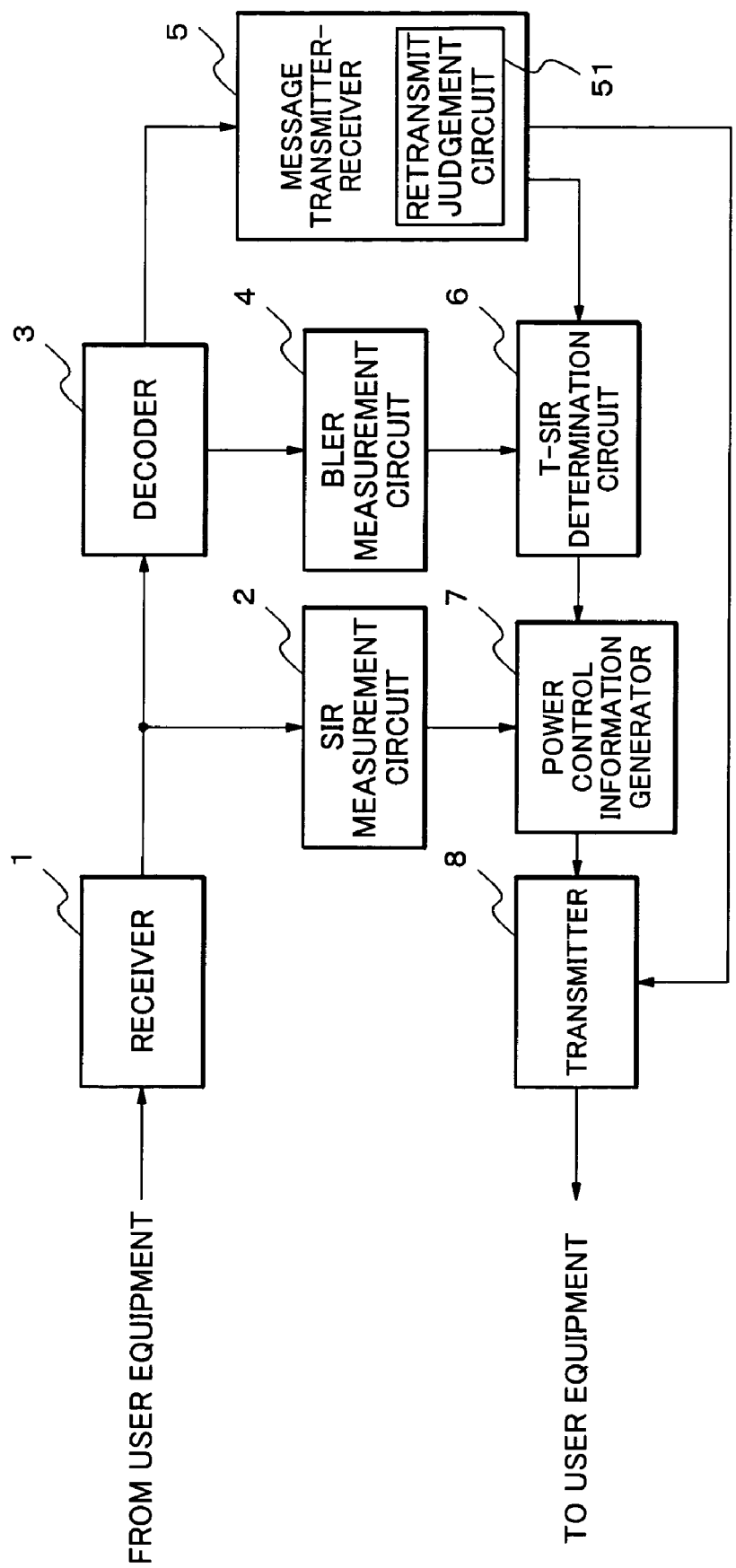
FIG. 5 is a block diagram showing a configuration of a base station according to a second embodiment of the present invention.

FIG. 5 is a block diagram showing a configuration of a base station according to a second embodiment of the present invention.

As shown in FIG. 5, the base station is composed of a receiver 1, an SIR measurement circuit 2, a decoder 3, a BLER measurement circuit 4, a message transmitter-receiver 5, a T-SIR determination circuit 6, a power control information generator 7, and a transmitter 8.

Specifically, in FIG. 5, the base station has a configuration similar to the configuration of the user equipment of FIG. 1, and operations of the base station are similar to those of FIG. 2 and FIG. 3. Hence, the second embodiment of the present invention is described by using FIG. 2, FIG. 3, and FIG. 5. Further, description overlapping with that of the first embodiment is omitted. Note that FIG. 6 is a sequence chart showing an exchange of the control message between the user equipment and the base station according to the second embodiment of the present invention.

In FIG. 5, the T-SIR determination circuit 6 of the base station determines a value of T-SIR=B by comparing M-BLER as a measurement value and T-BLER as a target value with each other. Hence, it is defined that the user equipment sets the transmission power thereof at a power value "b" and controls the transmission power concerned based on transmission power control information generated by the power control information generator 7 of the base station according to a result of the comparison between the value of the M-SIR and the value of the T-SIR=B.

Figure 6:
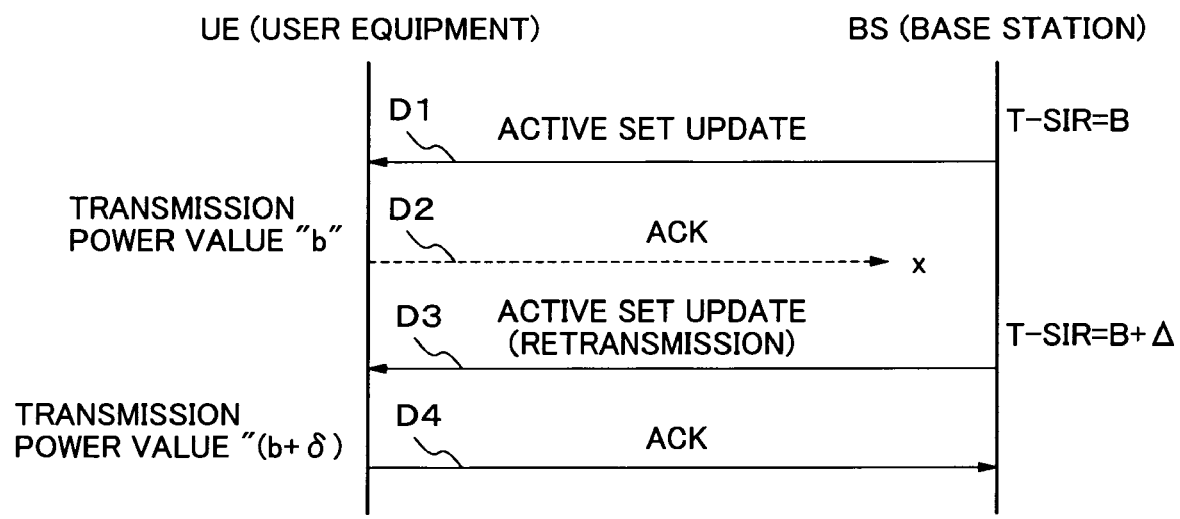
FIG. 6 is a sequence chart showing an exchange of a control message between user equipment and the base station according to the second embodiment of the present invention.

In this case, when "Active Set Update" as the control message for the user equipment is transmitted from the base station (Step D1 of FIG. 6), the user equipment transmits a response "ack" for the "Active Set Update" with the transmission power "b" (Step D2 of FIG. 6). Note that the response "ack" is a control message reporting reception of the "Active Set Update".

Here, when the base station cannot receive the response "ack" for the "Active Set Update" (Step D2 of FIG. 6), the T-SIR determination circuit 6 sets the target value of the SIR at the value of T-SIR=B+Δ as shown in FIG. 3 (Step B3 of FIG. 3).

Therefore, the power control information generator 7 of the base station generates the transmission power control information based on a comparison result between the value of the M-SIR and the value of the T-SIR=B+Δ (Step A3 of FIG. 2). Since the T-SIR is increased by the predetermined value A, the generated transmission power control information serves as information instructing the user equipment to increase the transmission power. Hence, the transmission power of the user equipment is controlled to be increased from the power value "b" by a predetermined value "δ".

Therefore, when the "Active Set Update" is retransmitted from the base station (Step D3 of FIG. 6, Step B4 of FIG. 3), the user equipment transmits a response ack for the retransmitted "Active Set Update" with the transmission power "b+δ" to the base station (Step D4 of FIG. 6).

Also in the second embodiment of the present invention, which is as described above, an effect similar to that of the first embodiment can be obtained. Specifically, when there is no response for the control message transmitted from the base station to the user equipment, the base station judges that the propagation characteristics have been deteriorated, and increases the T-SIR. Therefore, even in the channel in which the deterioration of the propagation characteristics cannot be judged based on the block error rate BLER, the communication disconnection owing to the reception failure of the control information between the base station and the user equipment will be avoided, thus making it possible to maintain the communication quality.

Note that the processing operations according to the respective flowcharts shown in FIG. 2 and FIG. 3 can be realized by causing a computer serving as a CPU (control unit) to read and execute a program prestored in a recording medium such as a ROM.

While this invention has been described in connection with certain preferred embodiments, it is to be understood that the subject matter encompassed by way of this invention is not to be limited to those specific embodiments. On the contrary, it is intended for the subject matter of the invention to include all alternatives, modifications and equivalents as can be included within the spirit and scope of the following claims.

What is claimed is:

1. A radio communication equipment for generating transmission power control information corresponding to a comparison result between receiving quality of a signal received from a communication counterpart and target quality, and for transmitting the transmission power control information to the communication counterpart, in a channel which block error rate (BLER) cannot be measured, comprising:
response monitoring means for monitoring a response from said communication counterpart for a control message transmitted to said communication counterpart;
controlling means for controlling said target quality to vary depending on a result of the monitoring of said response monitoring means, the target quality being controlled so as not to become larger than a threshold; and
means for retransmitting said control message when said result of monitoring determined by said response monitoring means shows that there is no response to said control message transmitted in the channel, which BLER cannot be measured, received from the communication counterpart.

2. A radio communication equipment for generating transmission power control information corresponding to a comparison result between receiving quality of a signal received from a communication counterpart and target quality, and for transmitting the transmission power control information to the communication counterpart, in a channel in which block error rate (BLER) cannot be measured, comprising:
a response monitoring means which monitors a response from said communication counterpart for a control message transmitted to said communication counterpart;
a controller which controls said target quality to vary depending on a result of the monitoring of said response monitor, the target quality being controlled so as not to become larger than a threshold; and
means for retransmitting said control message when said result of monitoring determined by said response monitoring means shows that there is no response to said control message transmitted in the channel, which BLER cannot be measured, received from the communication counterpart.

3. A radio communication equipment according to claim 2, wherein said response monitor causes retransmission of said control message when a result of monitoring shows that there is no response received from the communication counterpart.

4. A radio communication equipment according to claim 2, wherein said controller increases said target quality when a result of monitoring shows that there is no response received from the communication counterpart.

5. A radio communication equipment according to claim 2, wherein said controller increases said target quality when a result of monitoring shows that there is no response received from the communication counterpart continuously n (n is an integer of two or more) times.

6. A user equipment for generating transmission power control information corresponding to a comparison result between receiving quality of a signal received from a base station and target quality, and for transmitting said transmission power control information to said base station, in a channel in which block error rate (BLER) cannot be measured, comprising:
response monitoring means for monitoring a response from said base station for a control message transmitted to said base station;
controlling means for controlling said target quality to vary depending on a result of the monitoring of said response monitoring means, the target quality being controlled so as not to become larger than a threshold; and
retransmitting means for retransmitting said control message when said result of monitoring determined by said response monitoring means shows that there is no response to said control message transmitted in the channel, which BLER cannot be measured, received from the communication counterpart.

7. A user equipment for generating transmission power control information corresponding to a comparison result between receiving quality of a signal received from a base station and target quality, and for transmitting said transmission power control information to said base station, in a channel in which block error rate (BLER) cannot be measured, comprising:

a response monitoring means which monitors a response from said base station for a control message transmitted to said base station;

a controller which controls said target quality to vary depending on a result of the monitoring of said response monitor, the target quality being controlled so as not to become larger than a threshold; and a retransmitting device for retransmitting said control message when said result of monitoring determined by said response monitoring means shows that there is no response to said control message transmitted in the channel, which BLER cannot be measured, received from the communication counterpart.

8. A base station for generating transmission power control information corresponding to a comparison result between receiving quality of a signal received from a user equipment and target quality, and for transmitting said transmission power control information to said user equipment, in a channel in which block error rate (BLER) cannot be measured, comprising:

response monitoring means for monitoring a response from the user equipment for a control message transmitted to said user equipment;

controlling means for controlling said target quality to vary depending on a result of the monitoring of said response monitoring means, the target quality being controlled so as not to become larger than a threshold; and means for retransmitting said control message when said result of monitoring determined by said response monitoring means shows that there is no response to said control message transmitted in the channel, which BLER cannot be measured, received from the communication counterpart.

9. A base station for generating transmission power control information corresponding to a comparison result between receiving quality of a signal received from a user equipment and target quality, and for transmitting said transmission power control information to said user equipment, in a channel in which block error rate (BLER) cannot be measured, comprising:

a response monitoring means which monitors a response from the user equipment for a control message transmitted to said user equipment;

a controller which controls said target quality to vary depending on a result of the monitoring of said response monitor, the target quality being controlled so as not to become larger than a threshold; and a retransmitting device for retransmitting said control message when said result of monitoring determined by said response monitoring means shows that there is no response to said control message transmitted in the channel, which BLER cannot be measured, received from the communication counterpart.

10. A transmission power control method for a radio communication equipment for generating transmission power control information corresponding to a comparison result between receiving quality of a signal received from a communication counterpart and target quality, and for transmitting said transmission power control information to said communication counterpart, in a channel in which block error rate (BLER) cannot be measured, comprising:

a response monitoring step of monitoring a response from said communication counterpart for a control message transmitted to said communication counterpart;

a controlling step of controlling the target quality to vary-depending on a result of the monitoring of said response monitoring step, the target quality being controlled so as not to become larger than a threshold; and a retransmitting step of retransmitting said control message when said result of monitoring determined by said response monitoring step shows that there is no response to said control message transmitted in the channel, which BLER cannot be measured, received from the communication counterpart.

11. A transmission power control method according to claim 10, wherein said controlling step includes increasing said target quality when said result of the monitoring of said response monitoring step shows that there is no response received from said communication counterpart.

12. A transmission power control method according to claim 10, wherein said controlling step includes increasing said target quality when said result of the monitoring of said response monitoring step shows that there is no response received from said communication counterpart continuously n (n is an integer of two or more) times.

13. A recording medium encoded with a program for causing a computer to execute a transmission power control method for a radio transmission equipment for generating transmission power control information corresponding to a comparison result between receiving quality of a signal received from a communication counterpart and target quality, and for transmitting said transmission power control information to said communication counterpart, in a channel in which block error rate (BLER) cannot be measured, the program including structures for:

a response monitoring step of monitoring a response from said communication counterpart for a control message transmitted to said communication counterpart;

a controlling step of controlling said target quality to vary depending on said result of said monitoring of said response monitoring step, the target quality being controlled so as not to become larger than a threshold; and a retransmitting step of retransmitting said control message when said result of monitoring determined by said response monitoring step shows that there is no response to said control message transmitted in the channel, which BLER cannot be measured, received from the communication counterpart.

* * * * *